United States Patent
Louis et al.

(10) Patent No.: US 11,254,816 B2
(45) Date of Patent: Feb. 22, 2022

(54) MELT-PROCESSABLE COMPOSITION

(71) Applicant: SOLVAY SPECIALTY POLYMERS USA, LLC, Alpharetta, GA (US)

(72) Inventors: Chantal Louis, Alpharetta, GA (US); Ryan Hammonds, Atlanta, GA (US); Mattia Bassi, Milan (IT); Luca Merlo, Ixelles (BE)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 231 days.

(21) Appl. No.: 16/491,467

(22) PCT Filed: Mar. 5, 2018

(86) PCT No.: PCT/EP2018/055326
§ 371 (c)(1),
(2) Date: Sep. 5, 2019

(87) PCT Pub. No.: WO2018/162401
PCT Pub. Date: Sep. 13, 2018

(65) Prior Publication Data
US 2020/0032053 A1 Jan. 30, 2020

Related U.S. Application Data

(60) Provisional application No. 62/469,629, filed on Mar. 10, 2017.

(51) Int. Cl.
*C08L 71/00* (2006.01)
*C08G 65/40* (2006.01)
*C08L 27/18* (2006.01)
*H01B 3/30* (2006.01)
*H01B 3/42* (2006.01)
*H01B 3/44* (2006.01)

(52) U.S. Cl.
CPC .......... *C08L 71/00* (2013.01); *C08G 65/4012* (2013.01); *C08L 27/18* (2013.01); *H01B 3/307* (2013.01); *H01B 3/427* (2013.01); *H01B 3/445* (2013.01); *C08G 2650/40* (2013.01); *C08L 2203/202* (2013.01); *C08L 2205/025* (2013.01)

(58) Field of Classification Search
CPC .................. C08L 71/00; C08L 27/18
See application file for complete search history.

(56) References Cited

U.S. PATENT DOCUMENTS

| | | |
|---|---|---|
| 4,029,868 A | 6/1977 | Carlson |
| 4,940,525 A | 7/1990 | Ezzell et al. |
| 5,677,404 A | 10/1997 | Blair |
| 5,688,885 A | 11/1997 | Blair |
| 5,703,185 A | 12/1997 | Blair |
| 6,140,410 A | 10/2000 | Kolouch |
| 6,177,518 B1 | 1/2001 | Lahijani |
| 9,051,462 B2 | 6/2015 | Schlipf et al. |
| 2015/0225522 A1* | 8/2015 | Khan ............... C09D 171/00 428/379 |

FOREIGN PATENT DOCUMENTS

| | | |
|---|---|---|
| EP | 0367629 A1 | 5/1990 |
| EP | 1172382 A2 | 1/2002 |
| EP | 1323751 A2 | 7/2003 |
| WO | 2000049625 A1 | 8/2000 |
| WO | 2014037374 A1 | 3/2014 |

OTHER PUBLICATIONS

Pianca M. et al., "End groups in fluoropolymers", Journal of Fluorine Chemistry, 1999, vol. 95, p. 71-84, Elsevier Science SA.
Standard ASTM D 3835-02, "Standard Test Method for Determination of Properties of Polymeric Materials by Means of a Capillary Rheometer", 2002, p. 1-11.
Standard ISO 13320-09, "Particle size analysis—Laser diffraction methods", 2009, p. 1-58.

* cited by examiner

*Primary Examiner* — Mark S Kaucher
(74) *Attorney, Agent, or Firm* — Osha Bergman Watanabe & Burton LLP (57) ABSTRACT

The invention pertains to composition of fluoroplastic and poly(aryletherketone), to method of making the same, and to shaped products therefrom, including notably wire sheaths, which combine advantageous performances of both ingredients, which can be easily manufactured through conventional equipment's, and which notably deliver room temperature toughness, in combination with notably chemical resistance and dielectric properties of fluoroplastics and with mechanical performances of poly(aryl ether ketone)s.

21 Claims, 2 Drawing Sheets

MELT-PROCESSABLE COMPOSITION

CROSS-REFERENCE TO RELATED APPLICATION

This application claims priority to U.S. provisional application No. 62/469,629 filed on Mar. 10, 2017, the whole content of this application being incorporated herein by reference for all purposes.

TECHNICAL FIELD

The present invention pertains to composition of fluoroplastic and poly(aryletherketone), to method of making the same, and to shaped products therefrom, including notably wire sheaths and coatings.

BACKGROUND ART

Polymers having high fluorine content, being those perfluorinated or nearly perfluorinated, including notably polytetrafluoroethylene (PTFE), modified PTFE, fluorinated ethylene-propylene copolymers (FEP), tetrafluoroethylene/perfluoroalkylvinylether copolymers, are commonly valued for their high temperature rating, their chemical inertness, low friction, weather resistance, and good electrical properties, including notably very low dielectric properties. It is nevertheless generally acknowledged that their mechanical performances, such as room temperature toughness, tensile strength and rigidity, as well as high temperature resistance under load (as expressed e.g. by heat distortion temperature) are somehow inappropriate for certain highly demanding fields of use.

On the other side, poly(aryletherketone)s are well-known high performance plastics, valued in particular for their high mechanical performances, in particular very high modulus and strength, in addition to high thermal resistance. Nonetheless, while their chemical resistance and permeability, and/or electrical/dielectric properties maybe generally sufficient in different fields of use, it is nevertheless generally acknowledged that their performances with these regards may be inappropriate to cope with certain high demanding fields of use.

Now, the use of conventional PTFE or other perfluorinated thermoplastic copolymers of TFE in compounds with poly(aryletherketone)s is known per se.

Notably, EP 0367629 A (BICC PUBLIC LIMITED COMPANY) 9, May 1990 discloses a polymer composition for high performance cables comprising a minor amount (from 0.5 to 15%) of a conjugated aromatic polymer (e.g. PEEK) dispersed in a fully fluorinated polymer matrix. Addition of PEEK in FEP is notably described to the aim of enabling laser marking for labelling on the surface.

U.S. Pat. No. 6,177,518 (E.I. DUPONT DE NEMOURS AND CIE.) 23, Jan. 2001 discloses compositions of a melt-flowable fluoroplastic and poly(ether ketone ketone), which combine the advantageous properties of the two components, and which are provided, depending on the compositional ratio among the components, as dispersed phase of minor component in matrix of major component.

U.S. Pat. No. 9,051,462 (ELRINGKLINGER AG) 9, Jun. 2015 discloses a polymer compound, comprising a proportion of a fully fluorinated thermoplastically processible polymer material and a proportion of at least one additional high performance polymer selected from polyether ketones, polyether ether ketones and polyether aryl ketones, wherein the compound after melt compounding displays a homogeneous distribution of the proportions of the at least one additional high performance polymer and the polymer material. According to this document, the use of the said fully fluorinated thermoplastically processible polymer material comprising melt processible PTFE in the form of a TFE copolymer with a single comonomer, the content of which amounting to less than 3.5 mol percent, is effective to achieve a homogeneous distribution of the polymer components, so that no separated domain is no longer detectable.

It is hence a recognized challenge in the domain of these compounds to achieve homogeneous mixing of the components, so as to maximize properties' cumulative effects, especially when blending fluoroplastic and poly(aryl ether ketone) in substantially equivalent weight parts (e.g. about 50/50).

Now, it is also known that fluoropolymers may suffer of adhesion deficiencies when intended for use in coating compositions; in this area, the use of minor amount of aromatic resins as adhesion promoter is known; U.S. Pat. No. 6,140,410 (E.I. DUPONT DE NEMOURS AND CIE) 31, Oct. 2000 discloses a melt-fabricable fluoropolymer composition, comprising minor amounts of functionalized fluoropolymer resin and high temperature resistant thermoplastic resin adhesion promoter and a major amount of non-functional fluoropolymer resin; an exemplary embodiment disclosed therein (see ex. 21) provides for a compound made of 93.5% wt of a TFE/perfluoropropylvinyl ether copolymer, 4.0% wt of PEEK and 2.5% wt of a TFE copolymer including 2% wt of recurring units derived from a sulfonyl fluoride monomer of formula $CF_2=CF-[OCF_2CF(CF_3)]-OCF_2CF_2-SO_2F$. Nevertheless, this document does not address the problem of compounding fluoropolymers and poly(aryletherketone)s comprising substantial amounts of this latter component, so as to deliver a compound expressing the typical advantageous mechanical performances of poly(aryletherketone)s.

There is still hence a shortfall in the art for blends of fluoroplastics and poly(aryl ether ketone)s combining advantageous performances of both ingredients, which can be easily manufactured through conventional equipment's, and which notably deliver room temperature toughness, in combination with notably chemical resistance and dielectric properties of fluoroplastics and with mechanical performances of poly(aryl ether ketone)s.

SUMMARY OF INVENTION

The Applicant has now found that certain blends of fluoroplastics and poly(aryl ether ketone)s can be provided through standard manufacturing techniques, so delivering the above mentioned performances' spectra combining the advantages of both components. In particular, the blends of the present invention delivers toughness at room temperature, good dielectric properties and excellent mechanical performances, including notably good cut-through resistance which is especially valuable in the use of the inventive blend for insulation coating or jacketing of insulated wires.

The invention thus pertain to a composition [composition (C)] comprising:

at least one at least one tetrafluoroethylene (TFE) polymer [polymer (F)] selected from the group consisting of
(i) TFE homopolymers (PTFEs, herein after) and TFE copolymers comprising less than 0.5% wt, preferably less than 0.1% wt of recurring units derived from one or more than one ethylenically unsaturated fluorinated monomer other than TFE, with respect to the total weight of the said TFE copolymers (modified PTFEs, herein after), these PTFEs and modified PTFEs possessing a melt viscosity measured according to ASTM D3835, at 372° C. and 1000 $s^{-1}$, using a Hastelloy die of 1 mm×10 mm, of at most $1.5 \times 10^3$ Pa×sec; and
(ii) thermoplastic TFE copolymers comprising at least 1% wt. of recurring units derived from one or more than one ethylenically unsaturated fluorinated monomer other than TFE (thermoplastic TFE copolymers, herein after), with respect to the total weight of the said TFE copolymers; said polymer (F) being present in an amount of 20 to 59% wt, with respect to the sum of weight of polymer (F), polymer (PAEK) and polymer (I);

at least one poly(aryl ether ketone) [polymer (PAEK)], in an amount of 40 to 79% wt, with respect to the sum of weight of polymer (F), polymer (PAEK) and polymer (I); and at least one fluorinated polymer having at least one of (i) a —SO$_2$X group, with X being F, Cl; and (ii) a group of formula —SO$_2$—Ar*—(X*)$_n$, with Ar* being a hydrocarbon group, generally an aromatic group, X* being a —COOM* group, with M* being H or a cation (e.g. a metal cation or an ammonium cation), and n being zero or an integer of 1 to 3 [polymer (I)], in an amount of 0.05 to 20% wt, with respect to the sum of weight of polymer (F), polymer (PAEK) and polymer (I).

DESCRIPTION OF EMBODIMENTS

Composition (C)
Composition (C) comprises:
at least one polymer (F), as above detailed, in an amount of 20 to 59% wt, preferably of 25 to 55% wt, with respect to the sum of weight of polymer (F), polymer (PAEK) and polymer (I);
at least one polymer (PAEK), as above detailed, in an amount of 40 to 79% wt, preferably of 44 to 73% wt, with respect to the sum of weight of polymer (F), polymer (PAEK) and polymer (I); and
at least one polymer (I), as above detailed, in an amount of 0.05 to 20% wt, preferably of 0.1 to 5% wt, with respect to the sum of weight of polymer (F), polymer (PAEK) and polymer (I).

Depending on the performances which are required, the composition (C) may comprise substantially similar weight amounts of polymer (F) and polymer (PAEK); according to these embodiments, the composition (C) comprises:

at least one polymer (F), as above detailed, in an amount of 44 to 55% wt, preferably of 46 to 53% wt, with respect to the sum of weight of polymer (F), polymer (PAEK) and polymer (I);
at least one polymer (PAEK), as above detailed, in an amount of 44 to 55% wt, preferably of 46 to 53% wt, with respect to the sum of weight of polymer (F), polymer (PAEK) and polymer (I); and at least one polymer (I), as above detailed, in an amount of 1 to 4% wt, preferably of 1 to 3% wt, with respect to the sum of weight of polymer (F), polymer (PAEK) and polymer (I).

As an alternative, compositions (C) whereas polymer (PAEK) is predominant in the blend may also be encompasses; according to these embodiments, the composition (C) comprises:

at least one polymer (F), as above detailed, in an amount of 27 to 35% wt, with respect to the sum of weight of polymer (F), polymer (PAEK) and polymer (I);
at least one polymer (PAEK), as above detailed, in an amount of 64 to 72% wt, with respect to the sum of weight of polymer (F), polymer (PAEK) and polymer (I); and
at least one polymer (I), as above detailed, in an amount of 1 to 3% wt, with respect to the sum of weight of polymer (F), polymer (PAEK) and polymer (I).

Generally, for both the above listed embodiments, the overall weight of polymer (F), polymer (PAEK) and polymer (I) represents at least 40% wt, preferably at least 50% wt, more preferably at least 70% wt of the total weight of composition (C). Upper limit is not particularly critical, as compositions (C) essentially constituted by polymer (F), polymer (PAEK) and polymer (I), as above detailed, are valuable working embodiments of the present invention, being understood that minor amounts of impurities, spurious ingredients (e.g. in amounts of less than 1% wt) may be tolerated in compositions (C) essentially constituted by the above mentioned three listed ingredients.

Such other components, which may be present in limited or significant amounts, may, for example, be polymers other than polymer (F), polymer (PAEK) and polymer (I), maybe a filler, a pigment, a stabilizer, and additive, etc.

It is nevertheless more generally understood that the composition (C) may contain other components other than polymer (F), polymer (PAEK) and polymer (I), within a range not to substantially impair the afore-referred advantageous characteristics of the blend of these three components listed above.

Such polymers other than those listed above include, for instance, polycarbonate, polyethylene terephthalate, polubutylene terephthalate, polyarylate, polycaprolactone, a phenoxy resin, polysulfone, polyether sulfone, polyamide 6, polyamide 66, polyamide 11, polyamide 12, polyphenylene oxide, polyphenylene sulphide, an acrylonitrile/butadiene/styrene copolymer (ABS), polymethyl methacrylate (PMMA), polypropylene, polyethylene, polybutylene, a butadiene/styrene copolymer, an ethylene/propylene copolymer, an ethylene/propylene/diene rubber (EPDM), a styrene/butadiene block copolymer, a butadiene/acrylonitrile copolymer, acrylic rubber, a styrene/maleic anhydride copolymer, a styrene/phenyl maleimide copolymer, and the like.

The filler is preferably an inorganic filler, which includes, for example, fibrous fillers (such as glass fibers, carbon fibers, boron fibers, stainless steel microfibers, whiskers, . . . ), powdery fillers (such as talc, mica, graphite, molybdenum disulphide, calcium carbonate, silica, silica alumina, alumina, titanium dioxide, magnesium oxide . . . ).

The filler may also be a coloring pigment such as an organic pigment or an inorganic pigment. Specific examples of the coloring pigment include, for example, carbon black, iron oxide, aluminium-cobalt oxide, copper phthalocyanine, perylene, bismuth vanadate, and the like.

Polymer (I)
Polymer (I) comprises at least one of (i) a —SO$_2$X group, with X being F, Cl; and (ii) a group of formula —SO$_2$—

Ar*—(X*)$_n$, with Ar* being a hydrocarbon group, generally an aromatic group, X* being a —COOM* group, with M* being H or a cation (e.g. a metal cation or an ammonium cation), preferably being H, and n being zero or an integer of 1 to 3.

The amount of —SO$_2$X and/or —SO$_2$—Ar*—(X)$_n$ groups in polymer (I) is generally of at least 0.01, preferably at least 0.05, more preferably at least 0.1 meq/g. There's no substantial limitation as per the maximum amount of the said —SO$_2$X and/or —SO$_2$—Ar*—(X)$_n$ groups comprised in polymer (I). It is generally understood that the said —SO$_2$X and/or —SO$_2$—Ar*—(X*)$_n$ groups are generally present in an amount of at most 1 meq/g, preferably at most 0.8 meq/g, more preferably at most 0.5 meq/g.

Groups of formula —SO$_2$—Ar*—(X*)$_n$ are preferably groups wherein the Ar* is a phenyl group, and preferably groups of formula —SO$_2$-φCOOM*, with M* being H or a cation (e.g. a metal cation or an ammonium cation), preferably M* being a H.

Generally, polymer (I) comprises said —SO$_2$X groups and/or —SO$_2$—Ar*—(X*)$_n$ as pendant groups covalently bound to recurring units derived from a —SO$_2$X functional monomer (monomer (X), herein below), which has been possibly functionalized to bear —SO$_2$—Ar*—(X*)$_n$, as above detailed.

According to a first embodiment of the invention, polymer (I) is a polymer comprising at least one —SO$_2$X group, as above detailed, that is to say a polymer (I$_{SO2X}$).

Polymer (I$_{SO2X}$) may consist essentially of recurring units derived from one or more than one monomer (X), as above detailed, or can be a copolymer comprising recurring units derived from one or more than one monomer (X) and recurring units derived from one or more than one additional monomer different from monomer (X).

Generally, —SO$_2$X groups of polymer (I$_{SO2X}$) are groups of formula —SO$_2$F.

Suitable polymers (I$_{SO2X}$) comprising at least one —SO$_2$X group are those polymers comprising recurring units deriving from at least one ethylenically unsaturated fluorinated monomer containing at least one —SO$_2$X group, with X being F or Cl (monomer (A), hereinafter); and recurring units deriving from at least one ethylenically unsaturated fluorinated monomer free from —SO$_2$X group, with X being F or Cl (monomer (B), hereinafter).

The phrase "at least one monomer" is used herein with reference to monomers of both type (A) and (B) to indicate that one or more than one monomer of each type can be present in the polymer. Hereinafter the term monomer will be used to refer to both one and more than one monomer of a given type.

Non limiting examples of suitable monomers (A) are:
sulfonyl halide fluoroolefins of formula: CF$_2$=CF(CF$_2$)$_p$SO$_2$X, with X being F or Cl, preferably F, wherein p is an integer between 0 and 10, preferably between 1 and 6, more preferably p is equal to 2 or 3;
sulfonyl halide fluorovinylethers of formula: CF$_2$=CF—O—(CF$_2$)$_m$SO$_2$X, with X being F or Cl, preferably F, wherein m is an integer between 1 and 10, preferably between 1 and 6, more preferably between 2 and 4, even more preferably m equals 2;
sulfonyl fluoride fluoroalkoxyvinylethers of formula: CF$_2$=CF—(OCF$_2$CF(R$_{F1}$))$_w$—O—CF$_2$(CF(R$_{F2}$))$_y$SO$_2$X
with X being F or Cl, preferably F, wherein w is an integer between 0 and 2, R$_{F1}$ and R$_{F2}$, equal or different from each other, are independently F, Cl or a C$_1$-C$_{10}$ fluoroalkyl group, optionally substituted with one or more ether oxygens, y is an integer between 0 and 6; preferably w is 1, R$_{F1}$ is —CF$_3$, y is 1 and R$_{F2}$ is F;

sulfonyl halide aromatic fluoroolefins of formula CF$_2$=CF—Ar—SO$_2$X with X being F or Cl, preferably F, wherein Ar is a C$_5$-C$_{15}$ aromatic or heteroaromatic group.

Preferably monomer (A) is selected from the group of the sulfonyl fluoride fluorovinylethers of formula CF$_2$=CF—O—(CF$_2$)$_m$—SO$_2$F, wherein m is an integer between 1 and 6, preferably between 2 and 4.

More preferably monomer (A) is CF$_2$=CFOCF$_2$CF$_2$—SO$_2$F (perfluoro-5-sulfonylfluoride-3-oxa-1-pentene).

Non limiting examples of suitable ethylenically unsaturated fluorinated monomers of type (B) are:
C$_2$-C$_8$ perfluoroolefins, such as tetrafluoroethylene (TFE), hexafluoropropylene (HFP),
C$_2$-C$_8$ hydrogen-containing fluoroolefins, such as trifluoroethylene (TrFE), vinylidene fluoride (VDF), vinyl fluoride (VF), pentafluoropropylene, and hexafluoroisobutylene;
C$_2$-C$_8$ chloro- and/or bromo- and/or iodo-containing fluoroolefins, such as chlorotrifluoroethylene (CTFE) and bromotrifluoroethylene;
fluoroalkylvinylethers of formula CF$_2$=CFOR$_{f1}$, wherein R$_{f1}$ is a C$_1$-C$_6$ fluoroalkyl, e.g. —CF$_3$, —C$_2$F$_5$, —C$_3$F$_7$;
fluorooxyalkylvinylethers of formula CF$_2$=CFOX$_0$, wherein X$_0$ is a C$_1$-C$_{12}$ fluorooxyalkyl group comprising one or more than one ethereal oxygen atom, including notably fluoromethoxyalkylvinylethers of formula CF$_2$=CFOCF$_2$OR$_{f2}$, with R$_{f2}$ being a C$_1$-C$_3$ fluoro(oxy)alkyl group, such as —CF$_2$CF$_3$, —CF$_2$CF$_2$—O—CF$_3$ and —CF$_3$
fluorodioxoles, of formula:

wherein each of R$_{f3}$, R$_{f4}$, R$_{f5}$, R$_{f6}$, equal or different each other, is independently a fluorine atom, a C$_1$-C$_6$ fluoro(halo)fluoroalkyl, optionally comprising one or more oxygen atom, e.g. —CF$_3$, —C$_2$F$_5$, —C$_3$F$_7$, —OCF$_3$, —OCF$_2$CF$_2$OCF$_3$.

Preferably monomer (B) is selected among:
C$_2$-C$_8$ perfluoroolefins, preferably tetrafluoroethylene (TFE) and/or hexafluoropropylene (HFP);
chloro- and/or bromo- and/or iodo-containing C$_2$-C$_6$ fluoroolefins, like chlorotrifluoroethylene (CTFE) and/or bromotrifluoroethylene;
fluoroalkylvinylethers of formula CF$_2$=CFOR$_{f1}$ in which R$_{11}$ is a C$_1$-C$_6$ fluoroalkyl, e.g. —CF$_3$, —C$_2$F$_5$, —C$_3$F$_7$;
fluoro-oxyalkylvinylethers of formula CF$_2$=CFOR$_{O1}$, in which R$_{O1}$ is a C$_1$-C$_{12}$ fluorooxyalkyl having one or more ether groups, like perfluoro-2-propoxy-propyl; and
mixtures thereof.

More preferably, at least one monomer (B) is TFE.

Preferably, polymer (I$_{SO2X}$) is a fluorinated polymer comprising at least one —SO$_2$F functional group, and consists essentially of recurring units deriving from at least one ethylenically unsaturated fluorinated monomer (A) containing at least one sulfonyl fluoride functional group and from at least one ethylenically unsaturated fluorinated monomer (B).

End-groups, impurities, defects and other spurious units in limited amount (less than 1% moles, with respect to total moles of recurring units) may be present in the preferred polymer, in addition to the listed recurring units, without this affecting substantially the properties of the polymer.

Preferred polymer ($I_{SO2X}$) is selected from fluorinated polymers consisting essentially of:
(1) recurring units derived from tetrafluoroethylene (TFE), these recurring units (1) being generally in an amount of 25 to 99.9% moles, preferably 40 to 99.5% moles, with respect to total moles of polymer (I);
(2) recurring units derived from at least one monomer selected from the group consisting of:
(j) sulfonyl halide fluorovinylethers of formula: $CF_2$=CF—O—$(CF_2)_m SO_2 X$, with X being F or Cl, preferably F, wherein m is an integer between 1 and 10, preferably between 1 and 6, more preferably between 2 and 4, even more preferably m equals 2;
(jj) sulfonyl fluoride fluoroalkoxyvinylethers of formula: $CF_2$=CF—$(OCF_2 CF(R_{F1}))_w$—O—$CF_2(CF(R_{F2}))_y SO_2 X$ with X being F or Cl, preferably F, wherein w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, y is an integer between 0 and 6; preferably w is 1, $R_{F1}$ is —$CF_3$, y is 1 and $R_{F2}$ is F; and
(jjj) mixtures thereof;
these recurring units (2) being generally in an amount of 0.1 to 30% moles, preferably 0.5 to 20% moles, with respect to total moles of polymer ($I_{SO2X}$); and
(3) optionally, recurring units derived from at least one fluorinated monomer different from TFE, preferably a perfluorinated monomer, generally selected from the group consisting of hexafluoropropylene, perfluoroalkylvinylethers of formula $CF_2$=$CFOR'_{f1}$, wherein $R'_{f1}$ is a $C_1$-$C_6$ perfluoroalkyl, e.g. —$CF_3$, —$C_2F_5$, —$C_3F_7$; perfluoro-oxyalkylvinylethers of formula $CF_2$=$CFOR'_{O1}$, wherein $R'_{O1}$ is a $C_2$-$C_{12}$ perfluoro-oxyalkyl having one or more ether groups, including e.g. perfluoroalkyl-methoxy-vinylethers of formula $CF_2$=$CFOCF_2 OR'_{f2}$ in which $R'_{f2}$ is a $C_1$-$C_6$ perfluoroalkyl, e.g. —$CF_3$, —$C_2F_5$, —$C_3F_7$ or a $C_1$-$C_6$ perfluorooxyalkyl having one or more ether groups, like —$C_2F_5$—O—$CF_3$; these recurring units (3) being generally in an amount of 0 to 45% moles, preferably 0 to 40% moles, with respect to total moles of polymer ($I_{SO2X}$).

According to certain embodiment's, the preferred polymer ($I_{SO2X}$) generally consists essentially of:
(1) from 45 to 79.9% moles, preferably from 55 to 69.5% moles of recurring units derived from TFE;
(2) from 0.1 to 10% moles, preferably from 0.5 to 5% moles of recurring units derived from —$SO_2X$ groups-containing monomer(s) (2), as above detailed;
(3) from 20 to 45% moles, preferably from 30 to 40% moles of recurring units derived from fluorinated monomer(s) different from TFE (3), as above detailed.

According to certain other embodiment's, the most preferred polymer ($I_{SO2X}$) generally consists essentially of:
(1) from 55 to 95% moles, preferably from 70 to 92% moles of recurring units derived from TFE;
(2) from 5 to 30% moles, preferably from 8 to 20% moles of recurring units derived from —$SO_2X$ groups-containing monomer(s) (2), as above detailed;
(3) from 0 to 15% moles, preferably from 0 to 10% moles of recurring units derived from fluorinated monomer(s) different from TFE (3), as above detailed.

The fluorinated polymer comprising at least one —$SO_2X$ functional group may be prepared by any polymerization process known in the art. Suitable processes for the preparation of such polymers are for instance those described in U.S. Pat. No. 4,940,525 (THE DOW CHEMICAL COMPANY) Oct. 7, 1990, EP 1323751 A (SOLVAY SOLEXIS SPA) Feb. 7, 2003, EP 1172382 A (SOLVAY SOLEXIS SPA) 16 Nov. 2002.

The polymer ($I_{SO2X}$) comprising at least one —$SO_2X$, and especially a —$SO_2F$ group, may be optionally treated, e.g. with elemental fluorine, to remove polar chain end-groups to provide a fully fluorinated structure.

According to a second embodiment of the invention, polymer (I) comprises at least one —$SO_2$—$Ar^*$—$(X^*)_n$ group, as described above [polymer ($I_{SO2ArY}$)].

According to this embodiment, it is possible for polymer ($I_{SO2ArY}$) to simultaneously comprise, in addition to the said —$SO_2$—$Ar^*$—$(X^*)_n$ group, as above detailed, one or more than one —$SO_2X$ and/or —$SO_3M$ groups, with M being H or a cation (e.g. a metal cation or an ammonium cation). According to these embodiment's, it is generally understood that the polymer ($I_{SO2ArY}$) comprises —$SO_2$—$Ar^*$—$(X^*)_n$ groups in an amount of at least 20%, preferably at least 25%, more preferably at least 30%, and/or generally of at most 99%, preferably at most 70%, more preferably at most 60%, with respect to the total number of —$SO_3M$, —$SO_2$—$Ar^*$—$(X^*)_n$ and —$SO_2X$ groups in polymer ($I_{SO2ArY}$).

Nevertheless, embodiments whereas polymer ($I_{SO2ArY}$) comprises —$SO_2$—$Ar^*$—$(X^*)_n$ groups and is substantially free from —$SO_2X$ and/or —$SO_3M$ groups, as above detailed, are still encompassed by the present invention.

Generally, polymer ($I_{SO2ArY}$) comprises said $SO_2$—$Ar^*$—$(X^*)_n$ groups and, optionally, —$SO_2X$ and/or —$SO_3M$ groups, as pendant groups covalently bound to recurring units derived from a —$SO_2X$ functional monomer (monomer (X), as above detailed), which has been possibly functionalized to bear —$SO_2$—$Ar^*$—$(X^*)_n$, as above detailed.

Polymer ($I_{SO2ArY}$) is hence a polymer obtained by reacting polymer ($I_{SO2X}$), as above described, with an aromatic (poly)carboxylic acid, in the presence of a Lewis acid.

The choice of Lewis acid is not particularly limited; aluminium trihalides, such as notably $AlCl_3$, iron trihalides, such as notably $FeCl_3$, boron trihalides, such as notably $BF_3$, are exemplary Lewis acids which may be used.

Any aromatic (poly)carboxylic acid can be used, including mono- and poly-nuclear acids comprising one or more than one carboxylic acid groups. Benzoic acid can be notably used.

Without being bound by this theory, the Applicant believes that under Lewis acid catalysis, electrophilic substitution on the aromatic group of the (poly)carboxylic acid by at least a fraction of the —$SO_2X$ groups of the polymer ($I_{SO2X}$) intervenes, so as to generate moieties of formula —$SO_2$—$Ar^*$—$(X^*)_n$, as above described in lieu of —$SO_2X$ groups of precursor ($I_{SO2X}$).

As the electrophilic substitution proceeds, groups —$SO_2X$ are substituted by groups —$SO_2$—$Ar^*$—$(X^*)_n$; generally, a hydrolysis step and optionally a neutralization step is effected for terminating the reaction, and transform —COOM* group(s) of the —$SO_2$—$Ar^*$—$(X^*)_n$ moiety into —COOH groups.

Generally, hydrolysis, as above detailed, is also effective in transforming residual —$SO_2X$ groups, as above detailed, into groups of formula —$SO_3M$, with M being H or a cation (e.g. a metal cation or an ammonium cation), depending on how neutralisation is carried out.

In particular, when using a phosphate buffer, i.e. a mixture of $NaH_2PO_4/Na_2HPO_4$, as neutralizing agent (leading to a pH in water of around 7), residual —$SO_2X$ groups, as above detailed, are hydrolysed to groups of formula —$SO_3Na$.

Generally, depending on reaction conditions, it is possible to tune the fraction of groups —$SO_2$—$Ar^*$—$(X^*)_n$, with respect to the overall number of groups —$SO_2X$ and/or —$SO_3M$, as above detailed.

Polymer (PAEK)

As used herein, the expression "poly(aryl ether ketone)" or polymer (PAEK)" is hereby used to denote any polymer comprising more than 50% moles of recurring units ($R_{PAEK}$) comprising a —O—Ar'—C(=O)—$Ar^*$— group, where Ar' and Ar*, equal to or different from each other, are aromatic groups, the % moles being based on the total number of moles in the polymer (PAEK). The recurring units ($R_{PAEK}$) are generally selected from the group consisting of units of formulae (K-A) to (K-O) below, and mixtures of two of more than two of the same:

-continued (K-N)

(K-O)

wherein in each of formulae (K-A) to (K-O) above, each of R', equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4, preferably j' being equal to zero.

Each phenylene moiety of the recurring unit ($R_{PAEK}$) may, independently from one another, have a 1,2-, a 1,3- or a 1,4-linkage to the other moieties. According to an embodiment, each phenylene moiety of the recurring unit ($R_{PAEK}$), independently from one another, has a 1,3- or a 1,4-linkage to the other phenylene moieties. According to another embodiment yet, each phenylene moiety of the recurring unit ($R_{PAEK}$) has a 1,4-linkage to the other phenylene moieties.

According to preferred embodiment's, j' is zero for each R' in formulae (K-A) to (K-O) as above detailed.

According to preferred embodiment's, the recurring units ($R_{PAEK}$) are selected from the group consisting of units of formulae (J'-A) to (J'-D):

(J'-A)

(J'-B)

(J'-C)

(J'-D)

In some embodiments, the polymer (PAEK) is a poly (ether ether ketone) [polymer (PEEK)]. As used herein, the expression "poly(ether ether ketone)" or "polymer (PEEK)" denotes any polymer of which more than 50% moles of the recurring units ($R_{PAEK}$) are recurring units of formula (K'-A):

(K'-A)

the % moles being based on the total number of moles of recurring units in the polymer (PEEK).

According to these embodiments, at least 60% moles, at least 70% moles, at least 80% moles, at least 90% moles, at least 95% moles, at least 99% moles, or even substantially all recurring units ($R_{PAEK}$) are recurring units (K'-A), as above detailed. Preferred polymers (PEEK) are those wherein substantially all recurring units are units of formula (K'-A), being understood that end-groups, defects and minor amounts of impurities may be present.

In other embodiments, the polymer (PAEK) is a poly (ether ketone ketone) [polymer (PEKK)]. As used herein, the expression "poly(ether ketone ketone)" or "polymer (PEKK)" denotes any polymer of which more than 50% moles of the recurring units ($R_{PAEK}$) are recurring units of formula (K'-B) and/or recurring units of formula (K"-B):

(K'-B)

(K"-B)

the % moles being based on the total number of moles of recurring units in the polymer (PEKK).

According to these embodiments, at least 60% moles, at least 70% mole, at least 80% moles, at least 90% moles, at least 95% moles, at least 99% moles, or even substantially all of the recurring units ($R_{PAEK}$) are recurring units (K'-B) or (K"-B), or preferably a combination thereof. Preferred polymers (PEKK) are those wherein substantially all recurring units are units of formula (K'-B) and/or (K"-B), being understood that end-groups, defects and minor amounts of impurities may be present.

In yet other embodiments, the polymer (PAEK) is a poly(ether ketone) [polymer (PEK)]. As used herein, the expression "poly(ether ketone)" and "polymer (PEK)" denotes any polymer of which more than 50% moles of the recurring units ($R_{PAEK}$) are recurring units of formula (K''-C):

(K'-C)

the % moles being based on the total number of moles of recurring units in the polymer (PEK).

According to these embodiments, at least 60% moles, at least 70% mole, at least 80% moles, at least 90% moles, at least 95% moles, at least 99% moles, or even substantially all of the recurring units ($R_{PAEK}$) are recurring units (K'-C). Preferred polymers (PEK) are those wherein substantially all recurring units are units of formula (K'-C), being understood that end-groups, defects and minor amounts of impurities may be present.

In some embodiments, the polymer (PAEK) is a poly (ether diphenyl ether ketone) [polymer (PEDEK)]. As used herein, the expression "poly(ether diphenyl ether ketone)" or "polymer (PEDEK)" denotes any polymer of which more than 50% moles of the recurring units ($R_K$) are recurring units of formula (K'-D):

(K'-D)

(K'-D)

the % moles being based on the total number of moles of recurring units in the polymer (PEDEK).

According to these embodiments, at least 60% moles, at least 70% moles, at least 80% moles, at least 90% moles, at least 95% moles, at least 99% moles, or even substantially all recurring units ($R_K$) are recurring units (K'-D), as above detailed. Preferred polymers (PEDEK) are those wherein substantially all recurring units are units of formula (K'-D), being understood that end-groups, defects and minor amounts of impurities may be present.

In some other embodiments, the polymer (PAEK) is a poly(ether diphenyl ether ketone)-poly(ether ether ketone) copolymer [polymer (PEEK-PEDEK)]. As used herein, the expression "poly(ether diphenyl ether ketone)-poly(ether ether ketone) copolymer" or "polymer (PEEK-PEDEK)" denotes any polymer of which more than 50% moles of the recurring units ($R_K$) are a mixture of recurring units of formula (K'-A) and (K'-D), in the relative molar proportions (K'-A):(K'-D) of 95:5 to 5:95, preferably of 80:20 to 20:80.

Preferably, the polymer (PAEK) exhibits a melt viscosity measured according to ASTM D3835 at 400° C. and 1000 $s^{-1}$ using a tungsten carbide die of 0.5×3.175 mm of at least 0.07 kPa×s, more preferably at least 0.09 Pa×s, most preferably at least 0.12 kPa×s, and/or of at most 0.65 kPa×s, more preferably at most 0.55 kPa-s, more preferably at most 0.50 kPa×s, most preferably at most 0.45 kPa×s.

According to a preferred embodiment, the PAEK is PEEK. PEEK is notably commercially available as KetaSpire® PEEK from Solvay Specialty Polymers USA, LLC.

Polymer (F)

Polymer (F) is at least one tetrafluoroethylene (TFE) polymer selected from the group consisting of (i) TFE homopolymers (PTFEs, herein after) and TFE copolymers comprising less than 0.5% wt, preferably less than 0.1% wt of recurring units derived from one or more than one ethylenically unsaturated fluorinated monomer other than TFE, with respect to the total weight of the said TFE copolymers (modified PTFEs, herein after), these PTFEs and modified PTFEs possessing a melt viscosity measured according to ASTM D3835, at 372° C. and 1000 $s^{-1}$, using a tungsten carbide die of 0.5×3.175 mm, of at most $1.5 \times 10^3$ Pa×sec; and (ii) thermoplastic TFE copolymers comprising at least 1% wt. of recurring units derived from one or more than one ethylenically unsaturated fluorinated monomer other than TFE (thermoplastic TFE copolymers, herein after), with respect to the total weight of the said TFE copolymers.

Non limiting examples of suitable ethylenically unsaturated fluorinated monomers different from TFE of the modified PTFEs and/or of the thermoplastic TFE copolymers are:

$C_3$-$C_8$ perfluoroolefins, such as hexafluoropropylene (HFP), perfluoroisobutylene;

$C_2$-$C_8$ hydrogen-containing fluoroolefins, such as trifluoroethylene (TrFE), vinylidene fluoride (VDF), vinyl fluoride (VF), pentafluoropropylene, and hexafluoroisobutylene;

$C_2$-$C_8$ chloro- and/or bromo- and/or iodo-containing fluoroolefins, such as chlorotrifluoroethylene (CTFE) and bromotrifluoroethylene;

fluoroalkylvinylethers of formula $CF_2=CFOR_{f1}$, wherein $R_{f1}$ is a $C_1$-$C_6$ fluoroalkyl, e.g. —$CF_3$, —$C_2F_5$, —$C_3F_7$;

fluorooxyalkylvinylethers of formula $CF_2=CFOX_0$, wherein $X_0$ is a $C_1$-$C_{12}$ fluorooxyalkyl group comprising one or more than one ethereal oxygen atom, including notably fluoromethoxyalkylvinylethers of formula $CF_2=CFOCF_2OR_{f2}$, with $R_{f2}$ being a $C_1$-$C_3$ fluoro (oxy)alkyl group, such as —$CF_2CF_3$, —$CF_2CF_2$—O—$CF_3$ and —$CF_3$ fluorodioxoles, of formula:

wherein each of $R_{f3}$, $R_{f4}$, $R_{f5}$, $R_{f6}$, equal or different each other, is independently a fluorine atom, a $C_1$-$C_6$ fluoro(halo) fluoroalkyl, optionally comprising one or more oxygen atom, e.g. —$CF_3$, —$C_2F_5$, —$C_3F_7$, —$OCF_3$, —$OCF_2CF_2OCF_3$.

Preferably, polymer (F) is selected from TFE homopolymers, modified PTFEs and thermoplastic TFE copolymers, as above detailed, wherein the said modified PTFEs and thermoplastic TFE copolymers comprise (and preferably essentially consist of) recurring units derived from TFE and from at least one perfluorinated monomer other than TFE.

The expression 'essentially consist of', when used in connection with modified PTFEs and thermoplastic TFE copolymers is meant to indicate that end-chains, impurities, defects may be present in the polymer without these impairing/substantially modifying the properties of the said modified PTFEs and thermoplastic TFE copolymers.

The said perfluorinated monomer [monomer (PFM)] other than TFE is advantageously selected from the group consisting of:

(a) $C_3$-$C_8$ perfluoroolefins, preferably selected from the group consisting of hexafluoropropylene (HFP) and perfluoroisobutylene (PFIB);

(b) perfluoroalkylvinylethers (PAVE) of formula $CF_2=CFOR_{f1}$, wherein $R_{f1}$ is a $C_1$-$C_6$ perfluoroalkyl group, such as $CF_3$ (PMVE), $C_2F_5$ or $C_3F_7$;

(c) perfluorooxyalkylvinylethers of formula $CF_2=CFOX_0$, wherein $X_0$ is a a $C_1$-$C_{12}$ perfluorooxyalkyl group comprising one or more than one ethereal oxygen atom, including notably perfluoromethoxyalkylvinylethers of formula $CF_2=CFOCF_2OR_{f2}$, with $R_{f2}$ being a $C_1$-$C_3$ perfluoro(oxy)alkyl group, such as $—CF_2CF_3$, $—CF_2CF_2—O—CF_3$ and $—CF_3$; and wherein each of $R_{f3}$, $R_{f4}$, $R_{f5}$ and $R_{f6}$, equal to or different from each other, is independently a fluorine atom, a $C_1$-$C_6$ perfluoro(oxy)alkyl group, optionally comprising one or more oxygen atoms, such as $—CF_3$, $—C_2F_5$, $—C_3F_7$, $—OCF_3$ or $—OCF_2CF_2OCF_3$.

According to certain embodiments, polymer (F) is a PTFE or a modified PTFE, as above detailed, comprising less than 0.5% wt., preferably less than 0.1% wt. of recurring units derived from said monomer (PFM), with respect to the total moles of recurring units. Preferably, the modified PTFE according to this embodiment essentially consists of recurring units derived from TFE and from 0.0001 to 0.5% wt., preferably from 0.001 to 0.1% wt. of recurring units derived from said monomer (PFM), with respect to the total weight of modified PTFE.

As above explained, polymer (F) according to this embodiment is a low melt viscosity, possibly modified, PTFE. PTFEs and modified PTFEs suitable for being used according to this embodiment are generally provided as micropowders, which may be obtained by irradiation of standard high molecular weight PTFE/modified PTFE, and which are generally known for possessing a considerably lower molecular weight than the typical molecular weight of standard high molecular weight/high melt viscosity PTFEs/modified PTFEs, which enables the micropowders of PTFEs and/or modified PTFE to be by themselves melt-flowable.

Preferably, polymer (F) according to this embodiment is selected from the group consisting of possibly modified PTFE micropowders possessing a melt viscosity of at least 1 Pa×sec, preferably at least 10 Pa×sec, more preferably at least 50 Pa×sec, and/or of at most $1.2×10^3$ Pa×sec, preferably at most $1.0×10^3$ Pa×sec, even more preferably at most 800 Pa×sec, still more preferably at most 500 Pa×sec, when measured at 372° C. and 1000 $s^{-1}$, according to ASTM D3835, as above detailed.

Micropowders of PTFE or of modified PTFE which are suitable for being used in the composition (C) of the present invention are advantageously characterized by an average particle size $d_{50}$, determined by laser light diffraction according to ISO 13320, of at most 25.0 μm, preferably at most 22.0 μm, more preferably at most 20.0 μm. Lower boundary for $d_{50}$ is not particularly limited; it is nevertheless understood that to the sake of convenience in handling, $d_{50}$ of micropowders of PTFE or of modified PTFE is generally of at least 0.5 μm, preferably at least 1.0 μm.

Particularly good results have been obtained with micropowders of PTFE or of modified PTFE possessing an average size $d_{50}$ of between 2.0 μm and 15.0 μm, preferably of between 2.5 μm and 12.0 μm.

The average size $d_{50}$ of micropowders of PTFE or of modified PTFE is determined according to ISO 13320 by laser light diffraction, for instance using a laser diffraction particle size LS™ 13 320 MW—Beckman Coulter instrument.

Micropowders of PTFE or of modified PTFE which are suitable for being used in the composition (C) of the present invention are advantageously characterized by an amount of carboxylic chain end groups (in particular —COOH and —COF groups) of at least 13 mmol/kg, preferably at least 14 mmol/kg, more preferably at least 15 mmol/kg and/or advantageously at most 50 mmol/kg, preferably at most 40 mml/kg, more preferably at most 30 mmol/kg.

Amount of carboxylic chain end groups (—COOH and —COF) were determined according to the method described in PIANCA, M., et al. End groups in fluoropolymers. *Journal of Fluorine Chemistry*. 1999, vol. 95, p. 71-84. Concentration of relevant chain ends are expressed as mmoles of groups per kg of polymer (F).

A PTFE micropowder which has been found particularly effective in the compositions of the present invention is POLYMIST® PTFE micronized powder commercially available from Solvay Specialty Polymers USA, LLC.

According to other embodiments, the polymer (F) is selected from thermoplastic TFE copolymers comprising at least 1% wt. of recurring units derived from one or more than one ethylenically unsaturated fluorinated monomer other than TFE (thermoplastic TFE copolymers, herein after), with respect to the total weight of the said TFE copolymers. Because of the presence of such substantial amount of recurring units derived from fluorinated monomer other than TFE, the copolymers of TFE of this embodiment possess melt processability.

The thermoplastic TFE copolymers of this embodiment generally comprise recurring units derived from one or more than one monomer (PFM), as above detailed.

The TFE copolymers of these embodiments comprise advantageously at most 30% wt., preferably at most 25% wt., of recurring units derived from the monomer (PFM), with respect to all the recurring units of the said TFE copolymer.

Good results have been obtained with TFE copolymers as above detailed comprising at least 1% wt. and at most 25% wt. of recurring units derived from the monomer (PFM), with respect to all the recurring units of the said TFE copolymer.

According to certain variants of these embodiment's, the polymer (F) is selected from the group consisting of TFE copolymers comprising recurring units derived from hexafluoropropylene (HFP) and optionally from at least one perfluoroalkylvinylether complying with general formula $CF_2=CFOR_{f1}$, in which $R_{f1}$ is a $C_1$-$C_6$ perfluoroalkyl.

Preferred polymers (F) according to this variant are selected among TFE copolymers comprising (preferably consisting essentially of) recurring units derived from tetrafluoroethylene (TFE) and hexafluoropropylene (HFP) in an amount ranging from 3 to 15 wt % and, optionally, from 0.5 to 3 wt % of at least one perfluoroalkylvinylether, as above defined.

The expression 'consisting essentially of' is used within the context of the present invention for defining constituents of a polymer to take into account end chains, defects, irregularities and monomer rearrangements which might be comprised in said polymers in minor amounts, without this modifying essential properties of the polymer.

A description of such polymers (F) can be found notably in U.S. Pat. No. 4,029,868 (DUPONT) 14, Jun. 1977, in U.S. Pat. No. 5,677,404 (DUPONT) 14, Oct. 1997, in U.S. Pat. No. 5,703,185 (DUPONT) 30, Dec. 1997, and in U.S. Pat. No. 5,688,885 (DUPONT) 18, Nov. 1997.

Polymer (F) according to this variant are commercially available under the trademark TEFLON® FEP 9494, 6100 and 5100 from E.I. DuPont de Nemours, or from Daikin (e.g. FEP NP-101 material), or from Dyneon LLC (FEP 6322).

Best results within this embodiment have been obtained with TFE copolymers comprising (preferably consisting essentially of) recurring units derived from tetrafluoroethylene (TFE) and hexafluoropropylene (HFP) in an amount ranging from 4 to 12 wt % and either perfluoro(ethyl vinyl ether) or perfluoro(propyl vinyl ether) in an amount from 0.5 to 3% wt.

According to other variants of these embodiment's, the polymer (F) is selected from the group consisting of TFE copolymers comprising recurring units derived from at least one perfluoroalkylvinylether, as above defined and optionally further comprising recurring units derived from at least one $C_3$-$C_8$ perfluoroolefin.

Good results within this second variant have been obtained with TFE copolymers comprising recurring units derived from one or more than one perfluoroalkylvinylether as above specified; particularly good results have been achieved with TFE copolymers wherein the perfluoroalkylvinylether is perfluoromethylvinylether (of formula $CF_2=CFOCF_3$), perfluoroethylvinylether (of formula $CF_2=CFOC_2F_5$), perfluoropropylvinylether (of formula $CF_2=CFOC_3F_7$) and mixtures thereof.

Particularly, the polymer (F) of this second variant is advantageously a TFE copolymer consisting essentially of:
(a) from 3 to 35%, preferably from 5 to 12% by weight of recurring units derived from perfluoromethylvinylether;
(b) from 0 to 6% by weight of recurring units derived from one or more than one fluorinated comonomer different from perfluoromethylvinylether and selected from the group consisting of perfluoroalkylvinylethers complying with general formula $CF_2=CFOR_{f1}$, in which $R_{f1}$ is a $C_1$-$C_6$ perfluoroalkyl and perfluoro-oxyalkylvinylethers complying with general formula $CF_2=CFOX_{O1}$, in which $X_{O1}$ is a $C_1$-$C_{12}$ perfluorooxyalkyl having one or more ether groups; preferably derived from perfluoroethylvinylether and/or perfluoropropylvinylether;
(c) recurring units derived from tetrafluoroethylene, in such an amount that the sum of the percentages of the recurring units (a), (b) and (c) is equal to 100% by weight.

MFA and PFA suitable to be used for the composition of the invention are commercially available from Solvay Specialty Polymers Italy S.p.A. under the trade name of HYFLON® PFA P and M series and HYFLON® MFA.

According to another variant of these embodiments, the polymer (F) is advantageously a TFE copolymer consisting essentially of:
(a) from 0.5 to 5% by weight of recurring units derived from perfluoromethylvinylether;
(b) from 0.4 to 4.5% by weight of recurring units derived from one or more than one fluorinated comonomer different from perfluoromethylvinylether and selected from the group consisting of perfluoroalkylvinylethers, as above detailed and/or perfluoro-oxyalkylvinylethers, as above detailed; preferably derived from perfluoroethylvinylether and/or perfluoropropylvinylether;
(c) from 0.5 to 6% weight of recurring units derived from at least one $C_3$-$C_8$ perfluoroolefins, preferably derived from hexafluoropropylene; and
(d) recurring units derived from tetrafluoroethylene, in such an amount that the sum of the percentages of the recurring units (a), (b), (c) and (d) is equal to 100% by weight.

The invention further pertains to a method of making the composition (C), as above detailed, said method advantageously comprising mixing polymer (F), polymer (PAEK) and polymer (I), as above detailed.

Mixing of polymer (F), polymer (PAEK) and polymer (I) can be achieved by dry blending; nevertheless, the method of making preferably comprises melt-kneading polymer (F), polymer (PAEK) and polymer (I), although a step of dry blending may be carried out before the melt-kneading step.

From the viewpoint of operation efficiency, the method of the invention advantageously comprises melt-kneading polymer (F), polymer (PAEK) and polymer (I) by means of an extruder, generally a twin screw extruder.

The melt kneading temperature is preferably of 280° C. to 420° C.

The composition (C) of the invention can be processed into shaped products according to standard techniques applicable to thermoplastic materials.

Still another object of the present invention is hence a method for the manufacture of a shaped product comprising processing in the molten state the composition (C).

Said processing in the molten state may comprise at least one of extrusion molding, including wire extrusion molding, compression molding, injection molding, melt calendaring, rotational molding, thermoforming, and the like.

Shaped products therefrom may be of different types, including notably wire sheaths and coatings, whereas the combined properties of polymer (PAEK) and polymer (F) are particularly advantageous.

More specifically, the composition (C) can be used for providing a wire sheath around a conductor, either as primary insulator or as a cable jacket.

In this case, preferred manufacturing technique is wire extrusion molding, i.e. a technique whereas, by means of an extruder, composition (C) in the molten state is extruded on a core, made of a wire or an assembly of more than one wire.

The invention further pertains to a cable comprising a component comprising the composition (C), as above detailed.

Said component made from the composition (C) may include a jacket, a primary insulation sheath, and may include various sub-components such as a shield tape, a strength member, crossweb, film, buffer, separator, pull cord, sub-jacket, all well known in the industry, any one or more of which may be made or otherwise may comprise the composition (C) of the invention.

Preferably, the cable of the invention comprises at least one component selected from the group consisting of primary insulation sheath and jacket, made of the composition (C), as above detailed.

Preferred cables according to the invention are insulated wire, communication cables, and optical cables.

Figure 1:
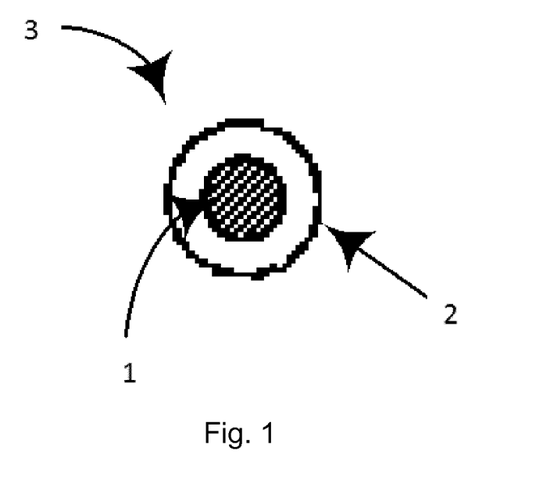
FIG. 1 is a section view of an insulated cable comprising a primary insulation sheath made from the composition (C) of the present invention.

FIG. 1 is a section view of an insulated cable comprising a primary insulation sheath made from the composition (C), according to a first embodiment of the invention. The insulated wire (3) of FIG. 1 comprises an optic fiber (1) or a metal conductor wire (1), generally aluminium or copper, preferably copper, surrounded by a primary insulation sheath (2) made from the composition (C) of the present invention. Preferred cables of this embodiment are insulated wires comprising a metal conductor wire.

The primary insulation sheath (2) can be advantageously obtained by extruding composition (C) using a tubing (including semi-tubing) technique which involves a crosshead assembly and a tip and die configuration that contains flow channels designed to maximize the uniformity of the coating on the central conductor wire or optic fiber. A tube of the composition (C) of the invention is advantageously extruded around and spaced from the conductor wire or the optic fiber, and said tube is advantageously extruded such that the thickness of the composition (C) is reduced or drawn down before it contacts the conductor wire or the optic fiber. A vacuum is advantageously provided between the conductor wire or the optic fiber and the composition (C) being extruded under the form of a tube, thereby causing atmospheric pressure to progressively press said extruded tube of composition (C) into contact with the conductor wire or with the optic fiber.

As an alternative, application of the composition (C) through means of pressure extrusion technique may also be suitable. In pressure extrusion, composition (C) can be fed to an extruder, wherein the conductor wire is advantageously brought into contact with molten composition (C) within the crosshead die to form the coating directly onto the conductor wire or the optic fiber. According to this embodiment, no pre-formed tube of composition (C) is extruded.

Figure 2:
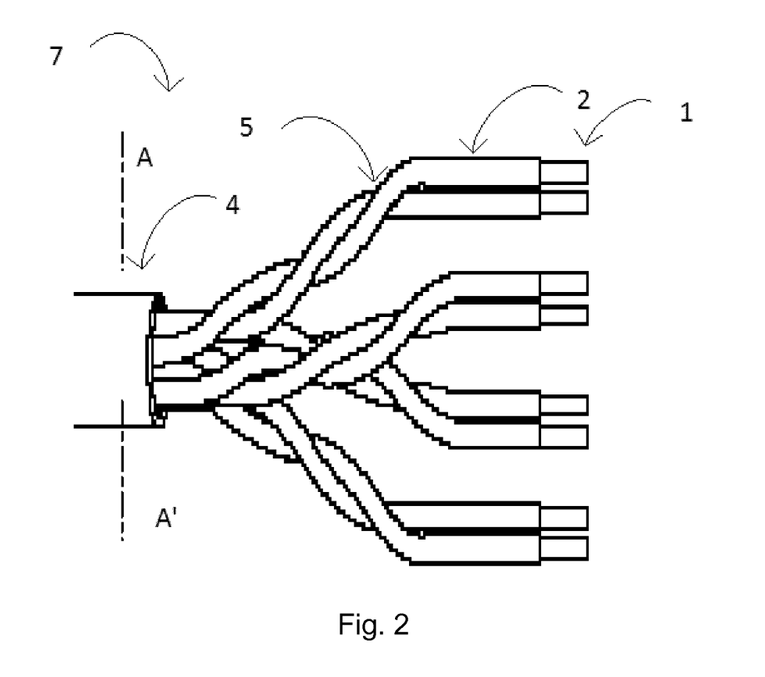
FIG. 2 is a side view, with parts broken away, of a communication cable wherein jacket and/or primary insulation sheath can comprise the composition (C) of the present invention.

FIG. 2 is a side view, with parts broken away, of a communication cable (7) according to a second embodiment of the invention. The electrical cable embodiment of the invention illustrated in FIG. 2 generally comprises a plurality of individual electrical conductors, which each comprises a conductor wire (1) and a primary insulation sheath (2) so that they are electrically insulated from one another. Pairs of said wires are generally twisted into a bundle (5) and several bundles are held together by jacket (4). Both jacket (4) and primary insulation sheath (2) can comprise the composition (C) as above detailed.

Jacket (4) can be similarly formed by extrusion either by tubing extrusion technique or by pressure extrusion technique, as above described for the primary insulation sheath, being understood that the conductor wire or the optical fiber will be replaced in this embodiment by an insulated conductor or insulated fiber or assembly thereof.

In communication cables, four pairs of insulated wires are generally twisted together and said twisted pairs (5) are typically held together by jacket (4).

Any one or more of jacket (4) and primary insulation sheaths (2) can be made of the composition (C) as above detailed.

Figure 3:
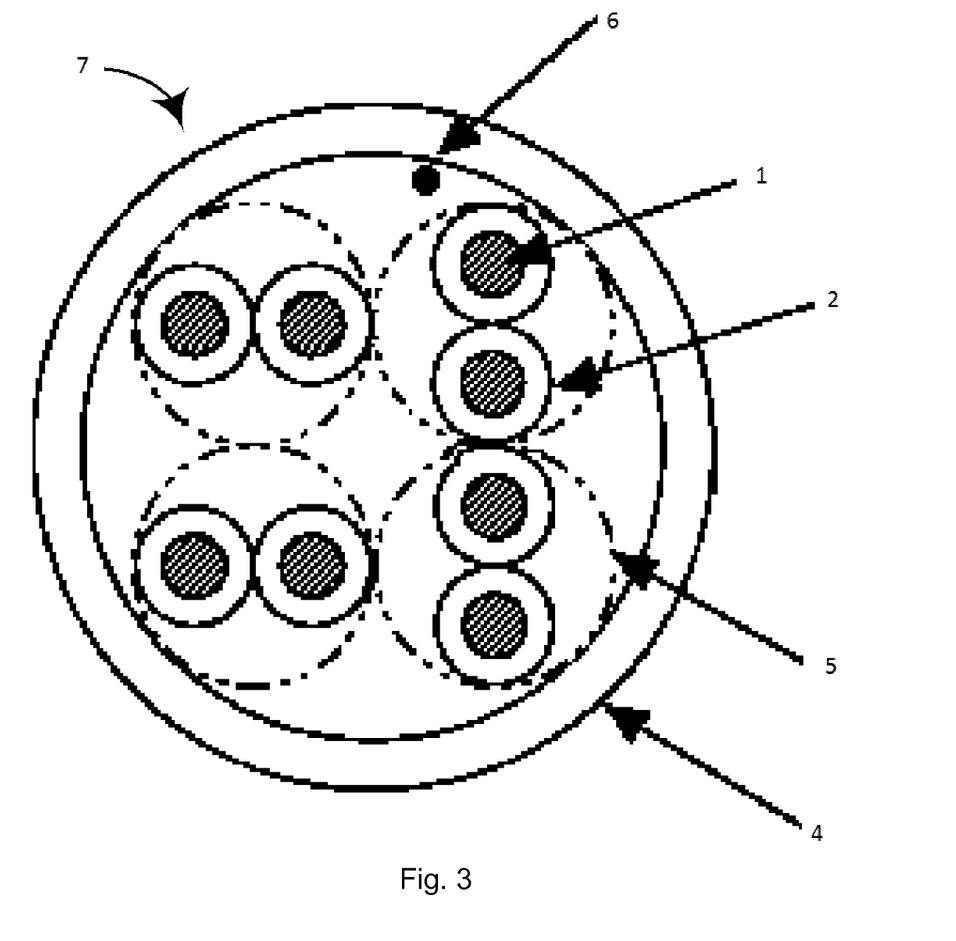
FIG. 3 is a cross-sectional view along A-A' plane (see FIG. 2) of the communication cable thereby sketched.

FIG. 3 is a cross-sectional view along A-A' plane (see FIG. 2) of the communication cable (7) according to the second embodiment of the invention the invention. A ripcord (6) can be present.

According to another embodiment of the invention, the cable is an optical cable. In an optical cable according to the invention, the conductor wire is replaced by glass optical fiber strands. Thus, a typical construction of an optical cable according to the invention comprises a plurality of groups of glass fiber optic strands wrapped around another glass strand or a coated steel wire or core, each of said groups being surrounded by a primary sheathing, and said plurality of groups being surrounded by a jacket. Equally in this case, the primary sheathing and/or the jacket can be made of the composition (C) as above detailed.

Should the disclosure of any patents, patent applications, and publications which are incorporated herein by reference conflict with the description of the present application to the extent that it may render a term unclear, the present description shall take precedence.

EXAMPLES

The invention will be now described in more detail with reference to the following examples, whose purpose is merely illustrative and not intended to limit the scope of the invention.

Raw Materials

Polymers (PAEK): KETASPIRE® KT-880P and KT-820 P are aromatic polyetheretherketone (PEEK) polymers available from Solvay Specialty Polymers USA, LLC.

Polymers (F):

Polymist® F5A and XPP-511 are PTFE micropowders available from Solvay Specialty Polymers USA, LLC, possessing a melt viscosity, measured according at ASTM D3835 at 372° C. and 1000 s$^{-1}$ of, respectively, 150 Pa×sec (F5A) and 1880 Pa×sec (XPP-511), a $d_{50}$, as measured by laser light diffraction of 3.90 μm (F5A) and 24.8 μm (XPP-511), and an amount of carboxylic chain end groups of around 20 mmol/kg (F5A) and around 10 mmol/kg (XPP-511).

Hyflon® PFA M620, Hyflon® PFA P 420 are melt-processable TFE copolymers with PAVE available from Solvay Specialty Polymers Italy SPA.

Polymer (I): Aquivion® $SO_2F$ PFSP is a TFE copolymer comprising recurring units derived from $CF_2$=CF—O—$CF_2CF_2$-$SO_2F$ (in their —$SO_2F$ form) available in form of powder with equivalent weight=980 g/eq (PFSP 980) or 790 g/eq (PFSP 790) from Solvay Specialty Polymers Italy SPA (indicated as 'Aquivion® $SO_2F$' in the following paragraphs).

Diphenyl sulfone (polymer grade) was procured from Proviron (99.8% pure).

Benzoic acid (grade Reagent Plus), aluminum chloride (anhydrous powder), acetone (reagent grade) were procured from Aldrich.

Magnesium oxide, Kyowamag MF-150, was procured from Kyowa Chemical Industry Co., Ltd., Japan.

Example 1: Preparation of Grafted Benzoic Acid on Aquivion® $SO_2F$

In a 1000 mL 4-neck reaction flask fitted with a stirrer, a $N_2$ inlet tube, a Claisen adapter with a thermocouple plunging in the reaction medium, and a condenser connected to a KOH scrubber, were introduced 375.00 g of benzoic acid, 138.75 g of Aquivion® $SO_2F$. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 180° C. At 180° C., 20.96 g of aluminum chloride were added via a powder dispenser to the reaction mixture over 20 minutes. After the addition, the reaction mixture was held at 180° C. for 5 hours, then the reactor content was poured from the reactor into a SS pan and cooled. The solid was broken up and ground in an attrition mill through a 2 mm screen. Benzoic acid and residual catalyst were extracted from the mixture with acetone and water, and the solid so obtained was neutralized using a $NaH_2PO_4/Na_2HPO_4$ buffer. The powder was then dried at 50° C. under vacuum for 12 hours yielding 287 g of a white powder. Analysis of the polymer by back-titration in NaOH and in $KHCO_3$ showed 335 µeq carboxylic acid-containing groups [—$SO_2$-ϕ-COOH]/g polymer, hence corresponding to and 496 µeq sodium sulfonate groups [—$SO_3Na$]/g polymer.

Use of Grafted Benzoic Acid on Aquivion® $SO_2F$ PFSP

Compositions for Examples C1 and E1 are described in Table 1, were combined using a Leistritz 18 mm co-rotating intermeshing twin-screw five barrel extruder. The extruder barrels were maintained at 284° C. at the feed section, followed by increased barrel temperatures up to 390° C. Melt temperatures of each blend were obtained by a hand-held probe and were between 395-410° C. Vacuum venting was provided at barrel section four and maintained at 25 mm Hg to remove residual moisture and volatiles. The melt extrudate was stranded and pelletized for testing or later processed by injection molding.

Injection molding was carried out after the material was dried for at least two hours at 150° C. at greater than 25 mm Hg vacuum. A Miniature Plastic Molding Mini-Jector was used to mold test Type I specimens that would conform to the corresponding ASTM test method. Barrel temperatures of 370-380° C. and mold temperatures of approximately 190° C. were used for processing the materials.

The data in Table 1 illustrates the improvement in mechanical performance when Aquivion® $SO_2F$ grafted with benzoic acid is utilized in highly loaded PTFE/PEEK blends. Specifically, the ductility of the compound was improved as shown by tensile strain at break of 12% in comparison to 6.5% for the control material. The testing was performed following ASTM D638 at 2"/min.

TABLE 1

|  |  | C1 | E1 |
|---|---|---|---|
| Component |  |  |  |
| PEEK, KT-880 P | wt % | 50 | 50 |
| PTFE, Polymist F5A | wt % | 50 | 50 |
| PFSP 980 w/Benzoic Acid | pph | 0.0 | 2.6 |
| Test |  |  |  |
| Tensile Modulus | ksi | 384 | 396 |
| Tensile Strain at Break | % | 6.5 | 12 |
| Tensile Strain at Yield | % | 4.0 | 4.9 |
| Tensile Strength at Yield | psi | 7,380 | 8,180 |

Examples C2 to E3: Preparation of Compositions Using Aquivion® $SO_2F$ Master Batch Approach Examples C2 to E3 in Table 2 were combined using a Leistritz 18 mm extruder as previously described. Before PEEK/fluoropolymer blends were prepared, a master batch of PEEK/Aquivion® $SO_2F$ (polymer powder with equivalent weight=980 g/eq) were combined at a ratio of 80/20 wt/wt with 0.3 pph magnesium oxide following similar compounding conditions as previously described. The master batch was utilized at the listed ratios included in Table 2 where the PEEK weight percent composition was held constant. Injection molding and testing was performed as previously described. Additionally, impact testing was performed following ASTM D256.

Table 2 shows an improvement when utilizing Aquivion® $SO_2F$ by the master batch approach. The properties shown here illustrate similar tensile properties but a noticeable improvement in notched impact.

TABLE 2

|  |  | C2 | E2 | E3 |
|---|---|---|---|---|
| Component |  |  |  |  |
| PEEK, KT-880 P | wt % | 54.14 | 50 | 50 |
| PTFE, Polymist F5A | wt % | 45.86 | 50 | 50 |
| 80% KT-880, 20% PFSP 980 | pph | — | 16 | — |
| 80% KT-880, 20% PFSP 980* | pph | — | — | 16 |
| Re-computed PFSP 980 | wt % | — | 3.2 | 3.2 |
| Test |  |  |  |  |
| Tensile Modulus | ksi | 415 | 405 | 407 |
| Tensile Strain at Break | % | 13 | 16 | 15 |
| Tensile Strain at Yield | % | 4.9 | 5.3 | 5.3 |
| Tensile Strength | psi | 8,870 | 8,680 | 8,710 |
| Notched Impact | ft-lb/in | 2.29 | 2.94 | 2.93 |

*Material was passed twice more through the extruder for additional residence time at temperature.

Examples E6 to E7: Improved Processability with Aquivion® $SO_2F$

The master batch approach and testing as again used here for work described in Table 3 as previously described. A similar process was used here as in the previous section, but with a larger twin screw extruder, a Coperion ZSK 26 mm co-rotating intermeshing extruder. Barrels were setup in the range of 340-360° C. with a vacuum of 26 mmHg before the melt exited the extruder and was pelletized. The PEEK/Aquivion® $SO_2F$ 80/20 wt/wt master batch used in Table 5 included 0.3 pph magnesium oxide. A control group of 50% PEEK and 50% Hyflon® PFA M620 was attempted to be produced in parallel but material could not be collected due to insufficient strand strength exiting the extruder. The ability to collect, mold, and test compositions included Aquivion® $SO_2F$ illustrates the improvement in compatibility by the better processing.

TABLE 3

|  |  | E6 | E7 |
|---|---|---|---|
| Component |  |  |  |
| PEEK, KT-880 P | wt % | 39.2 | 39.2 |
| PFA, Hyflon ® PFA M620 | wt % | 47.3 | 47.3 |
| 80% KT-880, 20% PFSP 980 | wt % | 13.5 | — |
| 80% KT-880, 20% PFSP 790 | wt % | — | 13.5 |
| Re-computed PFSP 980/PFSP 790 | wt % | 2.7 | 2.7 |
| Test |  |  |  |
| Tensile Modulus | ksi | 359 | 351 |
| Tensile Strain at Break | % | 3.8 | 5.2 |
| Tensile Strength at Break | psi | 7,420 | 7,950 |
| Tensile Strength at Yield | psi | 7,620 | 8,020 |
| Complete Break | ft-lb/in | 8.61 | 8.71 |
| Deflection to Max. Load | in | 0.322 | 0.27 |
| Energy to Max Load | ft-lbs | 2.534 | 2.07 |
| Total Energy | ft-lbs | 3.076 | 3.532 |
| Notched Izod Impact, Complete Break | ft-lb/in | 1.19 | 1.07 |
| Notched Izod Impact, Hinge Break | ft-lb/in | 1.01 | 0.83 |
| Impact Number of Bars Complete Brk | — | 2 | 2 |
| Impact Number of Bars Hinge Brk | — | 3 | 3 |

Examples C4 to C6: PTFE Selection

The following data in Table 5 was collecting using the Leistritz 18 mm extruder and Mini-Jector molding machine as previously described. The 80/20 wt/wt master batch used in Table 5 included 0.3 pph magnesium oxide. The data in Table 4 shows that the optimum properties are obtained with the combination of PEEK with a high flow PTFE (F5A) and Aquivion® $SO_2F$ master batch as a compatibilizer. The material obtained with a lower flow PTFE (XPP-511) exhibits lower strength and ductility (elongation at break). Dielectric constant was measured at 10 kHz following ASTM D150-98 with non-contacting electrodes on samples of 3 mm thickness obtained by injection molding. Data summarized below well demonstrate that the introduction of an effective amount of Aquivion® $SO_2F$, although comprising polar moieties of formula —$SO_2F$, while being effective in compatibilization, is not detrimentally affecting overall advantageous dielectric performances of the compound.

TABLE 4

| | | C4 | E8 | C5 | C6 |
|---|---|---|---|---|---|
| Component | | | | | |
| KT-880 P | wt % | 50 | 39.2 | 50 | 39.2 |
| PTFE F5A | wt % | 50 | 47.3 | — | — |
| PTFE XPP-511 | wt % | — | — | 50 | 47.3 |
| 80% KT-880, 20% PFSP 980 | wt % | — | 13.5 | — | 13.5 |
| Re-computed PFSP 980 | wt % | — | 2.7 | — | 2.7 |
| Test | | | | | |
| Tensile Modulus, ksi, ASTM D638 | ksi | 400 | 390 | 340 | 369 |
| Tensile Strain @ Break | % | 15 | 19 | 9.4 | 8.5 |
| Tensile Strain @ Yield | % | 5.4 | 5.7 | 9.8 | 8.8 |
| Tensile Strength @ Yield | psi | 8,100 | 8,000 | 6,940 | 7,490 |
| Notched Izod Impact | ft-lb/in | 1.89 | 1.84 | 1.08 | 1.09 |
| Dielectric Constant (10 kHz) | | 2.56 | 2.56 | — | — |

Examples C7 to E10: PEEK Viscosity and PTFE Loading

Examples C7-E9 (table 5) and C8-E10 (table 6) were prepared by utilizing the Leistritz 18 mm twin screw extruder, the Mini-Jector injection molding machine, and test methods as previously described. The master batch here contained 52 wt % KT-820, 28 wt % KT-880, 20 wt % Aquivion® $SO_2F$ (polymer powder with equivalent weight=980 g/eq), and 0.3 pph magnesium oxide. The comparative sample C7 shows lower strength, modulus, and breaking strain from tensile testing than E9 that contains Aquivion® $SO_2F$. Table 6 shows improved impact performance of a 30 wt % PTFE 70 wt % PEEK composition.

TABLE 5

| | | C7 | E9 |
|---|---|---|---|
| Component | | | |
| PEEK, KT-820 P | wt % | 50 | 39.2 |
| PFA, Hyflon ® PFA P420 | wt % | 50 | 47.3 |
| 80% PEEK, 20% PFSP 980 | wt % | — | 13.5 |
| Re-computed PFSP 980 | wt % | — | 2.7 |
| Test | | | |
| Tensile Modulus | ksi | 330 | 350 |
| Tensile Strain @ Break | % | 4.8 | 6.6 |
| Tensile Strain @ Yield | % | 4.6 | 5.7 |
| Tensile Strength @ Break | psi | 6,940 | 7,980 |
| Tensile Strength @ Yield | psi | 7,110 | 8,210 |
| Notched Izod Impact | ft-lb/in | 2.51 | 2.33 |
| Notched Izod Impact Std Dev | ft-lb/in | 0.117 | 0.173 |

TABLE 6

| | | C8 | E10 |
|---|---|---|---|
| Component | | | |
| PEEK, KT-880 P | wt % | 70 | 59.2 |
| PTFE, Polymist F5A | wt % | 30 | 27.3 |
| 80% PEEK, 20% PFSP 980 | wt % | — | 13.5 |
| Re-computed PFSP 980 | wt % | — | 2.7 |
| Test | | | |
| Tensile Modulus | ksi | 510 | 500 |
| Tensile Strain @ Break | % | 16 | 17 |
| Tensile Strain @ Yield | % | 5.5 | 5.7 |
| Tensile Strength @ Break | psi | 9,000 | 8,780 |
| Tensile Strength @ Yield | psi | 10,600 | 10,700 |
| Notched Izod Impact | ft-lb/in | 3.05 | 4.81 |
| Notched Izod Impact Std Dev | ft-lb/in | 0.33 | 0.337 |

Examples C9 to E11: PEEK Viscosity and PTFE Loading

Examples C9 and E11 (table7) were prepared by utilizing the Leistritz 18 mm twin screw extruder, the Mini-Jector injection molding machine, and test methods as previously described. In this case, molded parts were annealed in a forced air circulating oven at 200° C. for 2 hr. The master batch used contained 80 wt % KT-820, 20 wt % Aquivion® $SO_2F$ (polymer powder with equivalent weight=980 g/eq), and 0.3 pph magnesium oxide. The comparative sample C9 shows lower tensile strain at break and notched impact performance in comparison to E11 that contains Aquivion® $SO_2F$. Further, the annealing step removes the possibility of artificially high tensile strain at break or notched impact performance from material that is not fully crystallized. The retention of high tensile strain at break and notched impact performance after annealing is even further improved by the incorporation of Aquivion® $SO_2F$.

Also, similarly as already shown before, the inclusion of Aquivion® $SO_2F$ polymer did not impact the dielectric constant.

TABLE 7

| | | C9 | E11 |
|---|---|---|---|
| Component | | | |
| PEEK, KT-820 P | wt % | 70 | 59.2 |
| PTFE, Polymist F5A | wt % | 30 | 27.3 |
| 80% KT-820, 20% PFSP 980 | wt % | — | 13.5 |
| Re-computed PFSP 980 | wt % | — | 2.7 |

TABLE 7-continued

|  |  | C9 | E11 |
|---|---|---|---|
| Test |  |  |  |
| Tensile Modulus | ksi | 486 | 481 |
| Tensile Strain @ Break | % | 29 | 53 |
| Tensile Strength @ Yield | psi | 11,300 | 11,200 |
| Notched Izod Impact | ft-lb/in | 6.63 | 17.9 |
| Dielectric Constant (10 kHz) | — | 2.73 | 2.73 |

The invention claimed is:

1. A composition (C) comprising:
at least one at least one tetrafluoroethylene (TFE) polymer (F) selected from the group consisting of
(i) TFE homopolymers (PTFEs), and TFE copolymers comprising less than 0.5% wt. of recurring units derived from one or more than one ethylenically unsaturated fluorinated monomer other than TFE, with respect to the total weight of the said TFE copolymers (modified PTFEs), the PTFEs and modified PTFEs possessing a melt viscosity measured according to ASTM D3835, at 372° C. and 1000 s$^{-1}$, using a using a Hastelloy die of 1 mm×10 mm, of at most 1.5×103 Pa×sec; and
(ii) thermoplastic TFE copolymers comprising at least 1% wt. of recurring units derived from one or more than one ethylenically unsaturated fluorinated monomer other than TFE (thermoplastic TFE copolymers), with respect to the total weight of the said TFE copolymers; said polymer (F) being present in an amount of 20 to 59% wt, with respect to the sum of weight of polymer (F), polymer (PAEK) and polymer (I);
at least one poly(aryl ether ketone) (polymer (PAEK)), in an amount of 40 to 79% wt, with respect to the sum of weight of polymer (F), polymer (PAEK) and polymer (I); and
at least one fluorinated polymer (polymer (I)) having at least one of
(i) a —SO$_2$X group, with X being F, Cl; and
(ii) a group of formula —SO$_2$Ar*—(X*)$_n$, with Ar* being a hydrocarbon group, X* being a —COOM* group, with M* being H or a cation, and n being zero or an integer of 1 to 3, in an amount of 0.05 to 20% wt, with respect to the sum of weight of polymer (F), polymer (PAEK) and polymer (I).

2. The composition (C) of claim 1, which comprises:
at least one polymer (F), in an amount of 25 to 55% wt., with respect to the sum of the weight of the polymer (F), the polymer (PAEK) and the polymer (I);
at least one polymer (PAEK), in an amount of 44 to 73% wt., with respect to the sum of the weight of the polymer (F), the polymer (PAEK) and the polymer (I); and
at least one polymer (I), in an amount of 0.1 to 5% wt, with respect to the sum of the weight of the polymer (F), the polymer (PAEK) and the polymer (I).

3. The composition (C) of claim 2, said composition comprising:
at least one polymer (F) in an amount of 44 to 55% wt., with respect to the sum of the weight of the polymer (F), the polymer (PAEK) and the polymer (I);
at least one polymer (PAEK), in an amount of 44 to 55% wt., with respect to the sum of the weight of the polymer (F), the polymer (PAEK) and the polymer (I); and
at least one polymer (I), in an amount of 1 to 4% wt., with respect to the sum of the weight of the polymer (F), the polymer (PAEK) and the polymer (I).

4. The composition (C) of claim 2, said composition comprising:
at least one polymer (F), in an amount of 27 to 35% wt., with respect to the sum of the weight of the polymer (F), the polymer (PAEK) and the polymer (I);
at least one polymer (PAEK), in an amount of 64 to 72% wt., with respect to the sum of the weight of the polymer (F), the polymer (PAEK) and the polymer (I); and
at least one polymer (I), in an amount of 1 to 3% wt., with respect to the sum of the weight of the polymer (F), the polymer (PAEK) and the polymer (I).

5. The composition (C) according to claim 1, wherein the overall weight of the polymer (F), the polymer (PAEK) and the polymer (I) represents at least 40% wt. of the total weight of composition (C), and/or wherein the composition (C) is essentially constituted by the polymer (F), the polymer (PAEK) and the polymer (I).

6. The composition (C) according to claim 1, wherein the amount of —SO2X and/or —SO2-Ar*—(X*)n groups in the polymer (I) is of at least 0.01 meq/g, and at most 1 meq/g.

7. The composition (C) according to claim 1, wherein the polymer (I) comprises at least one group of formula —SO2-Ar*—(X*)n wherein the Ar* is a phenyl group.

8. The composition (C) according to claim 1, wherein the polymer (I) comprises said —SO$_2$X groups and/or —SO2-Ar*—(X*)n as pendant groups covalently bound to recurring units derived from a —SO$_2$X functional monomer, which has been optionally functionalized to bear —SO2Ar*—(X*)n-.

9. The composition (C) according to claim 1, wherein the polymer (PAEK) is a polymer comprising more than 50% moles of recurring units (RPAEK), the % moles being based on the total number of moles in the polymer (PAEK), which are selected from the group consisting of units of formulae (K-A) to (K-O) below, and mixtures of two of more than two of the same:

(K-A)

(K-B)

-continued (K-C)

(K-D)

(K-E)

(K-F)

(K-G)

(K-H)

(K-I)

(K-J)

(K-K)

(K-L)

(K-M)

(K-N)

wherein in each of formulae (K-A) to (K-O) above, each of R', equal to or different from each other, is independently selected at each occurrence from a C1-C12 group optionally comprising one or more than one heteroatoms; sulfonic acid and sultanate groups; phosphonic acid and phosphonate groups; amine and quaternary ammonium groups; and each of j', equal to or different from each other, is independently selected at each occurrence from 0 and an integer of 1 to 4.

10. The composition (C) of claim 9, wherein the recurring units (RPAEK) are selected from the group consisting of units of formulae (J'-A) to (J'-D):

(J'-A)

(J'-B)

(J'-C)

(J'-D)

11. The composition (C) according to claim 1, wherein the polymer (F) is selected from TFE homopolymers, modified PTFEs and thermoplastic TFE copolymers, wherein the said modified PTFEs and thermoplastic TFE copolymers comprise recurring units derived from TFE and from at least one perfluorinated monomer other than TFE, and wherein said perfluorinated monomer (PFM) other than TFE is selected from the group consisting of:

(a) $C_3$-$C_8$ perfluoroolefins;
(b) perfluoroalkylvinylethers (PAVE) of formula $CF_2=CFOR_{f1}$, wherein $R_{f1}$ is a $C_1$-$C_6$ perfluoroalkyl group;
(c) perfluorooxyalkylvinylethers of formula $CF_2=CFOX_0$, wherein $X_0$ is a $C_1$-$C_{12}$ perfluorooxyalkyl group comprising one or more than one ethereal oxygen atom, with $R_{f2}$ being a $C_1$-$C_3$ perfluoro(oxy)alkyl group; and
(d) (per)fluorodioxoles of formula:

wherein each of $R_{f3}$, $R_{f4}$, $R_{f5}$ and $R_{f6}$, equal to or different from each other, is independently a fluorine atom, a $C_1$-$C_6$ perfluoro(oxy)alkyl group, optionally comprising one or more oxygen atoms.

12. The composition (C) according to claim 11, wherein the polymer (F) is a PTFE or a modified PTFE, said modified PTFE essentially consisting of recurring units derived from TFE and from 0.0001 to 0.5% wt., with respect to the total weight of modified PTFE.

13. The composition (C) of claim 12, wherein the polymer (F) is selected from the group consisting of modified PTFE micropowders possessing a melt viscosity of at least 1 Pa×sec, and at most $1.2 \times 10^3$ Pa×sec, when measured at 372° C. and 1000 $s^{-1}$ according to ASTM D3835.

14. The composition (C) of claim 12, wherein the polymer (F) is selected from micropowders of PTFE or of modified PTFE:
having an average particle size d50, determined by laser light diffraction according to ISO 13320, of at most 25.0 μm and at least 0.5 μm; and/or
having an amount of carboxylic chain end groups (COOH and COF groups) of at least 13 mmol/kg and at most 50 mmol/kg.

15. The composition (C) according to claim 12, wherein the polymer (F) is a thermoplastic TFE copolymer comprising at least 1% wt. and at most 25% wt. of recurring units derived from the monomer (PFM), with respect to all the recurring units of the said TFE copolymer, which is selected from the group consisting of:
TFE copolymers comprising recurring units derived from hexafluoropropylene (HFP) and optionally from at least one perfluoroalkylvinylether complying with general formula $CF_2=CFOR_{f1}'$ in which $R_{f1}'$ is a $C_1$-$C_6$ perfluoroalkyl;
TFE copolymers comprising recurring units derived from at least one perfluoroalkylvinylether complying with general formula $CF_2=CFOR_{f1}'$ in which $R_{f1}'$ is a $C_1$-$C_6$ perfluoroalkyl and optionally further comprising recurring units derived from at least one $C_3$-$C_8$ perfluoroolefin.

16. A method of making the composition (C) according to claim 1, said method comprising mixing the polymer (F), the polymer (PAEK) and the polymer (I), said method comprising melt-kneading the polymer (F), the polymer (PAEK) and the polymer (I).

17. A method of making a shaped product comprising processing in the molten state the composition (C) according to claim 1, wherein said processing comprises at least one of extrusion molding, compression molding, injection molding, melt calendaring, rotational molding, and thermoforming.

18. A cable comprising a component made of the composition (C) according to claim 1, wherein said component made from the composition (C) comprises a jacket and a primary insulation sheath, and optionally includes subcomponents selected from a shield tape, a strength member, crossweb, film, buffer, separator, pull cord, and sub-jacket.

19. The composition (C) of claim 7, wherein the polymer (I) comprises at least one group of formula —$SO_2$-Φ-COOM*, wherein M* is H or a cation selected from a metal cation or an ammonium cation.

20. The composition (C) of claim 11, wherein the $C_3$-$C_8$ perfluoroolefins are selected from the group consisting of hexafluoropropylene (HFP) and perfluoroisobutylene (PFIB).

21. The composition (C) according to claim 1, wherein the polymer (I) comprises at least one group of formula —$SO_2$—Ar*—$(X^*)_n$ wherein Ar* is an aromatic group.

* * * * *

UNITED STATES PATENT AND TRADEMARK OFFICE
CERTIFICATE OF CORRECTION

PATENT NO.         : 11,254,816 B2
APPLICATION NO.    : 16/491467
DATED              : February 22, 2022
INVENTOR(S)        : Chantal Louis et al.

Page 1 of 1

It is certified that error appears in the above-identified patent and that said Letters Patent is hereby corrected as shown below:

In the Claims

• In Claim 6, Column 26, Line 36, "–SO2X" should read -- –SO$_2$X --, and "–SO2–Ar*–(X*)n" should read -- –SO$_2$–Ar*–(X*)$_n$ --.

• In Claim 7, Column 26, Lines 40-41, "–SO2–Ar*–(X*)n" should read -- –SO$_2$–Ar*–(X*)$_n$ --.

• In Claim 8, Column 26, Lines 43-44, "–SO2–Ar*–(X*)n" should read -- –SO$_2$–Ar*–(X*)$_n$ --, and Line 47, "–SO2Ar*–(X*)n–" should read -- –SO$_2$–Ar*–(X*)$_n$ --.

• In Claim 10, Column 29, Line 25, the formula (K-O)  should be removed.

• In Claim 14, Column 30, Lines 52-53, "COOH and COF groups" should read -- –COOH and –COF groups --.

Signed and Sealed this
Sixteenth Day of September, 2025

Coke Morgan Stewart
*Acting Director of the United States Patent and Trademark Office*